United States Patent [19]
Ashkin et al.

[11] 3,725,810
[45] Apr. 3, 1973

[54] OPTICAL STIMULATED EMISSION DEVICES EMPLOYING SPLIT OPTICAL GUIDES

[75] Inventors: Arthur Ashkin, Rumson; Erich Peter Ippen; Rudolf Kompfner, both of Middletown, all of N.J.

[73] Assignee: Bell Telephone Laboratories, Incorporated, Murray Hill, Berkeley Heights, N.J.

[22] Filed: Apr. 23, 1971

[21] Appl. No.: 136,831

[52] U.S. Cl............331/94.5, 307/88.3, 350/96 WG
[51] Int. Cl.................................................H01s 3/00
[58] Field of Search ....331/94.5 D, 94.5 L; 307/88.3; 350/96 WG

[56] References Cited

UNITED STATES PATENTS

| 2,827,825 | 3/1958 | White | 350/96 R |
|---|---|---|---|
| 3,636,474 | 1/1972 | DeMaria | 331/94.5 D |
| 3,493,889 | 2/1970 | Henkel | 331/94.5 L |
| 3,386,787 | 6/1968 | Kaplan | 350/96 WG |
| 3,498,864 | 3/1970 | Ogle | 350/96 B UX |
| 3,556,659 | 1/1971 | Hawes | 356/75 |

Primary Examiner—John K. Corbin
Attorney—R. J. Guenther and Arthur J. Torsiglieri

[57] ABSTRACT

There is disclosed a coherent optical device in which the stimulated emission of coherent radiation is achieved by monochromatic light launched into a split guiding structure which includes a fluid active medium. Typically, the active fluid flows transverse to the axis of the guiding structure through split solid members thereof spaced apart in the order of a wavelength of the light. In one embodiment of the invention, the solid members have guiding regions with higher indices of refraction than the fluid active medium. The monochromatic light propagates in and along these regions; and its fringing field pumps the fluid. In a second embodiment, the solid members have lower indices of refraction than the fluid active medium. The monochromatic light is then concentrated in a region of the fluid. The disclosed devices include stimulated Raman-emission devices and dye lasers.

15 Claims, 8 Drawing Figures

OPTICAL STIMULATED EMISSION DEVICES EMPLOYING SPLIT OPTICAL GUIDES

BACKGROUND OF THE INVENTION

This invention relates to improvements in coherent optical devices, such as frequency converters and coherent radiation amplifiers. Such devices include stimulated Raman-emission devices and dye lasers.

In the copending application of two of us, namely A. Ashkin and E. P. Ippen, Ser. No. 99,990, filed Dec. 21, 1970, and assigned to the assignee hereof, improved fluid-type optical oscillators of both the above-mentioned varieties were disclosed which showed higher pumping power efficiencies than prior art devices, had relatively low apparent rates of damage to the fluid active media and substantially overcame the deleterious thermal effects in prior art devices. The stimulated emission of radiation was there achieved in a guiding structure, typically a dielectric capillary tube having a small internal diameter with the fluid active medium therein or an optical fiber of small transverse dimension surrounded by the fluid active medium.

It is desirable to have alternatives to the above-described optical oscillators which provide comparable and additional improvements over prior art devices.

SUMMARY OF THE INVENTION

We have discovered that Raman oscillation and other useful coherent optical effects can be achieved in a split guiding structure typically including a fluid active medium flowing transversely through spaced solid members separated by dimensions of the order of a wavelength of the supplied monochromatic radiant energy. For the purposes of our invention, the above-mentioned spacing dimensions may be in the range from approximately 0.10 to 10.0 times the wavelength of the monochromatic light.

We have further recognized that the principles of Raman oscillators, according to our invention, are also applicable to dye lasers and directly lead to improved forms of dye lasers.

In one embodiment of our invention, the solid members of the split guiding structure have guiding regions with higher indices of refraction than the active fluid. Monochromatic pumping energy is propagated in and along these guiding regions transverse to the flowing medium; and its evanescent or fringing field pumps the fluid.

In a second embodiment of our invention, the solid members of the split guiding structure have lower indices of refraction than the active fluid. The pumping light is then concentrated in and guided along a region of the active fluid.

According to a primary feature of our invention, deterioration of a fluid active medium is avoided by flowing the medium from a relatively large pressurized reservoir through the relatively thin gap in the split guiding structure. The flow rate is such that a reservoir of less than one liter capacity could supply active medium flowing through the guide for many weeks.

As contrasted to the transverse flow arrangements of the above-cited copending application, our split-guide technique makes possible significantly smaller effective spot sizes and increased pumping efficiency with consequent increase in gain.

Like similar devices in the above-cited copending application, the Raman oscillation can here be achieved with a power level of the supplied radiation that is substantially less than that required in prior art Raman oscillators and below the bulk oscillation threshold. The bulk oscillation threshold is the threshold for oscillation in a Raman-emission device, as calculated from the Raman cross section without guiding of the pump light or Raman-scattered light.

Two additionally desirable features of our invention are the highly acceptable quality of guiding obtained in the presence of high pumping light intensity in a split guiding structure and the relatively low apparent rate of damage of the active medium. In addition, for both Raman oscillators and dye lasers, the strong guiding action itself counteracts any residual thermal effects, such as thermal lens effects.

In addition, deleterious thermal effects such as thermal defocusing, characteristic of high-power liquid optical devices such as dye lasers, can be avoided in devices according to our invention because guiding of the pump beam enables relatively long pathlengths in a medium of relatively low dye concentration without any loss of total gain.

BRIEF DESCRIPTION OF THE DRAWINGS

A more complete understanding of the foregoing and other features and advantages according to our invention can be obtained from the following detailed description with reference to the accompanying drawings in which.

DESCRIPTION OF THE ILLUSTRATIVE EMBODIMENTS

To explain the operation of our invention, a stimulated emission device, suitable as either a Raman-emission device or a dye laser, is first described with reference to FIGS. 1A and 1B of the drawings.

Figure 1A:
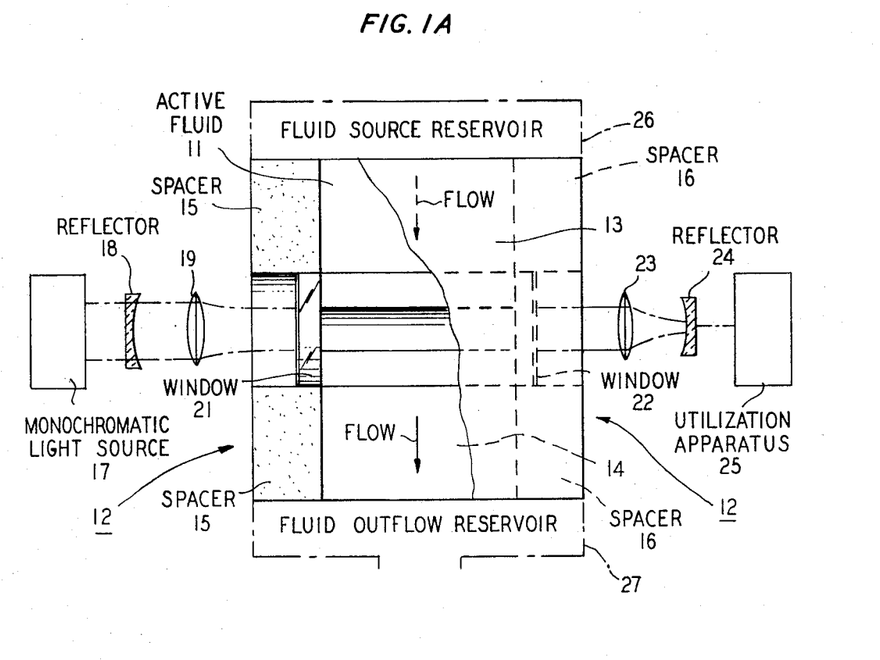
FIG. 1A is a partially pictorial, partially schematic illustration of apparatus for the stimulated emission of radiation including the split guiding structure according to our invention.
Figure 1B:
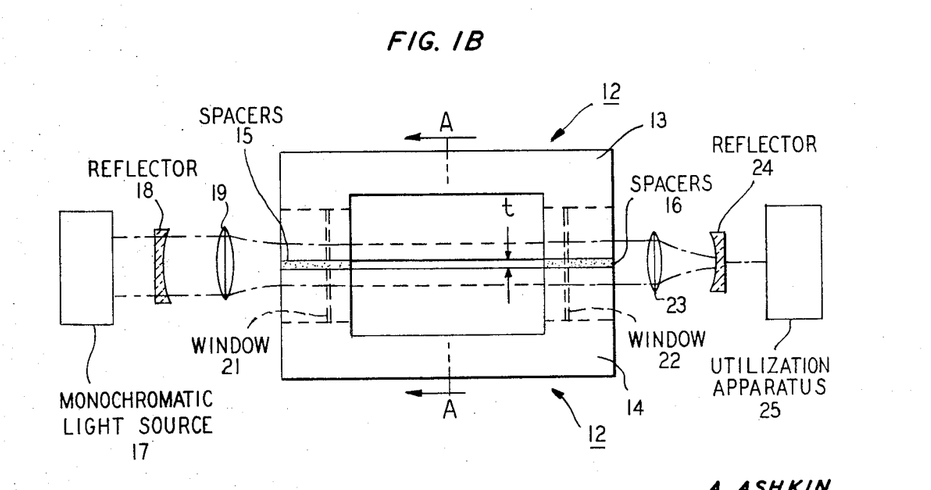
FIG. 1B is an orthogonal view of the apparatus shown in FIG. 1A.

In FIGS. 1A and 1B, the stimulated emission of coherent radiation is to be achieved in the active fluid 11 flowing transversely through the split guiding structure 12. The stimulated emission is to be achieved in response to monochromatic light supplied from a source 17 through the dichroic reflector 18, which is transmissive of the monochromatic light, but reflective for the stimulated emission from fluid 11, and through the focusing lens 19. Lens 19 focuses the beam down through window 21 with an antireflection coating and into structure 12.

The split guiding structure 12 includes spaced optically transparent solid members 13 and 14 having regions adapted for the guidance of both the supplied light and the desired output radiation. As shown in FIG. 1B, a minimum gap spacing $t$ of the order of the wavelength of the supplied light, between members 13 and 14 through which the active fluid 11 passes, is maintained by spacers 15 and 16.

Solid members 13 and 14 direct the flow of the fluid 11 from the source reservoir 26 through the region of gap spacing $t$ where the fluid is excited by the transversely propagating guided monochromatic light, and into outflow reservoir 27. The output radiation, also guided by the guiding regions of members 13 and 14, is transmitted through a second antireflection coated window 22 to the focusing lens 23 and the partially transmissive reflector 24, which completes the resonator for the stimulated emission and passes a portion thereof as output radiation. The remaining radiation of the stimulated emission from fluid 11 is returned through fluid 11 toward reflector 18. Utilization apparatus 25 receives the stimulated output radiation from the device.

Specifically, dichroic reflector 18 is totally reflective for the output radiation and dichroic reflector 24 is partially reflective and partially transmissive. Such dichroic reflectors are typically made by conventional techniques employing multiple dielectric layers upon a conventional transmissive substrate. Illustratively, for the case of a Raman-emission device, reflector 24 could be totally reflective for any residual supplied light from source 17, so that it would be completely consumed in the Raman-emission process in fluid 11. Nevertheless, reflector 24 could also be transmissive for the supplied light, especially if nearly all of the supplied light is consumed on a single pass through fluid 11. Reflector 24 for the case of a dye laser could also be transmissive for the supplied light. Separation of the supplied light from the desired laser output could than be accomplished by techniques well known in the laser art.

Lenses 19 and 23, which concentrate the bidirectionally reflected radiation to a small spot size, have focal lengths and dispositions in the optical resonator to direct most of the radiation reflected from the adjacent reflector back into the guiding regions of structure 12.

To give rise to the flow in the device of FIGS. 1A and 1B, the fluid 11 is pressurized by source reservoir 26, which illustratively includes a source of inert gas such as nitrogen, at a pressure above atmospheric pressure. The outflow reservoir 27 is then vented to the atmosphere.

Source 17 is typically a laser operating at a frequency to provide gain in the active fluid 11 and capable of either pulsed operation or continuous-wave operation. Utilization apparatus 25 should be suitable for receiving the output radiation from either a Raman device or a dye laser. For example, it may advantageously respond to a single mode at the Raman-shifted wavelength from a Raman-emission device or to a very broad spectrum of wavelengths as can be supplied by a dye laser.

Figure 2A:
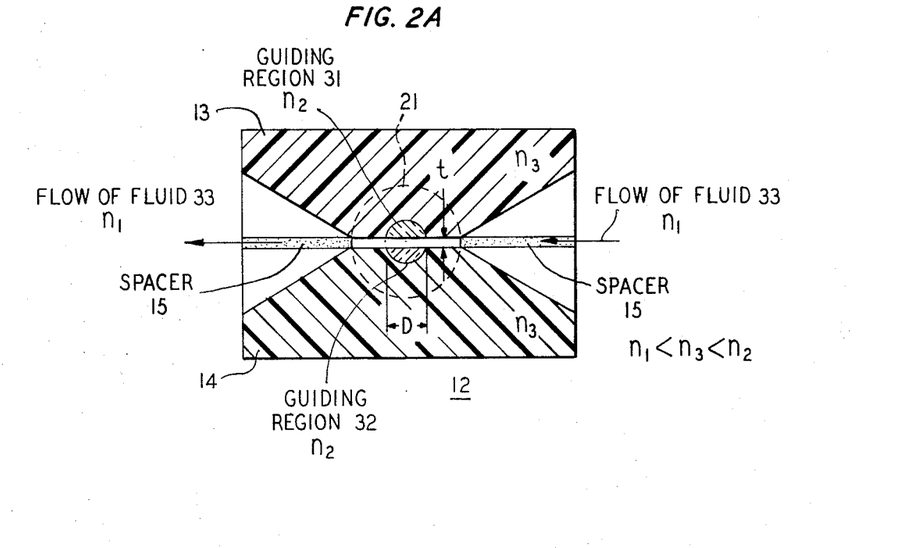
FIG. 2A is a partially pictorial, partially schematic illustration of a first embodiment of our invention showing a view of the split guiding structure taken from the section plane indicated as section line AA in FIG. 1B.
Figure 2B:
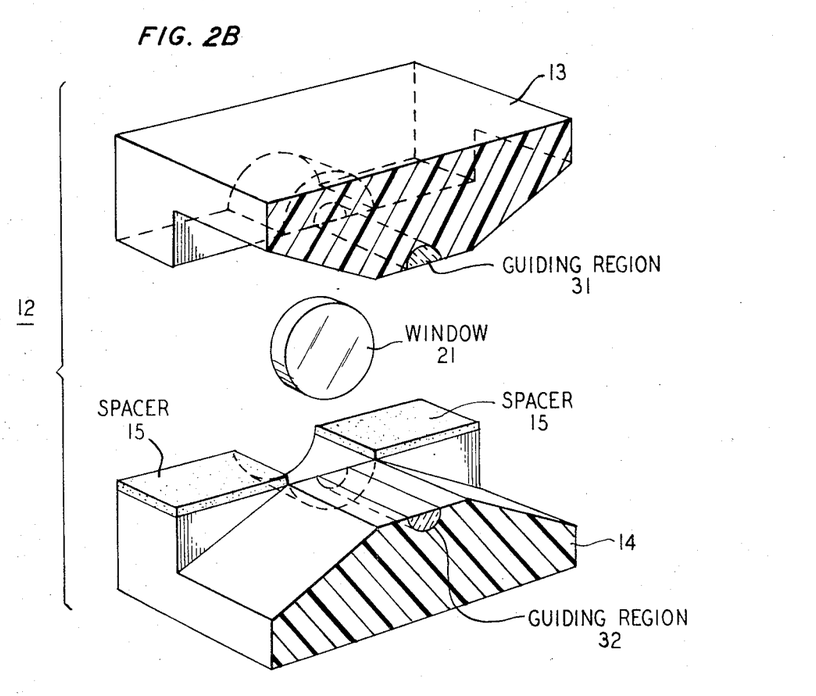
FIG. 2B is an exploded perspective view of the section of the split guiding structure of FIG. 2A useful in understanding the detail of the structure.

To illustrate a first embodiment of our invention, reference is made to FIGS. 2A and 2B which show a view of split guiding structure 12 of FIGS. 1A and 1B taken from the section plane indicated as line AA in FIG. 1B. This embodiment, as well as the embodiments described hereinbelow, as most readily shown in the section view as provided in FIGS. 2A and 2B. It should be understood that all components not shown in the section views described hereinbelow rmain the same as in FIGS. 1A and 1B.

In FIGS. 2A and 2B, solid members 13 and 14 contain hemi-cylindrical guiding regions 31 and 32 of higher refractive index than fluid 33 and the members 13 and 14. The monochromatic pumping light is launched into the split guiding structure 12 through window 21 and propagates in and along guiding regions 31 and 32. Its evanescent or fringing field pumps the fluid 33 as it passes through structure 12. The excited fluid emits radiation which is also guided by regions 31 and 32 and which reflects back and forth through the structure.

For guidance of the light in the dielectric guiding regions 31 and 32 of FIGS. 2A and 2B, typically two relationships are satisfied: first, the regions have a refractive index for the guided light exceeding the ones of the materials bounding them; and second, the dimensions of the regions in which the guiding is to take place are comparable to the wavelength of the light to be propagated therein.

In the first embodiment of our invention, therefore, it will be assumed that:

$$n_1, n_3 < n_2 \qquad (1)$$

for both the pumping light and the desired output radiation, where $n_1$ is the refractive index of the active fluid 33, $n_2$ the refractive index of the regions 31 and 32, and $n_3$ the index of the solid members 13 and 14, all as shown in FIG. 2A. In general, the relationship between $n_1$ and $n_3$ may vary. For the purpose of illustration, it will be assumed that $n_1$ is less than $n_3$ in the present embodiment.

Satisfaction of the dimensional relationship for guidance in regions 31 and 32, of course, depends upon both the wavelength of monochromatic light employed from source 17, and the wavelength or wavelengths of the desired output. Regions 31 and 32 with a diameter D as shown in FIG. 2A, anywhere in the range from the wavelength of guided light to 100 times the wavelength can produce satisfactory guidance for one or many wavelengths. It should be understood that the excited fluid may emit radiation with any of a very large number of wavelengths, including wavelengths for waves propagating parallel to the long axis of the guiding regions 31 and 32 and wavelengths for waves propagating at various angles thereto. Significant stimulated emission can develop only for wavelengths for which the energy loss in the guiding regions is low, and in which radiation can reflect back and forth through the guide. Significant output radiation therefore can occur only for wavelengths supported by the guiding regions 31 and 32. A diameter D of guiding regions 31 and 32 can generally be chosen to accommodate either the single Raman-shifted wavelength from a Raman-emission device or the entire spectrum of wavelengths supplied by a dye laser.

It might be preferable for some applications to have single mode guidance for a particular wavelength in the regions 31 and 32. This can be achieved by having $n_2$ only slightly greater than $n_3$. It is readily shown that guiding regions 31 and 32 approximate single mode guides if $$n_2 \approx n_3(1 + \Delta) \quad (2)$$

where $$\Delta \leq \tfrac{1}{8} (\lambda/D)^2 \quad (3)$$

and $\lambda$ is the wavelength of the light for which single mode guidance is desired, that is, the free space wavelength of the light divided by the index of refraction of the guide, and D is the diameter of the regions 31 and 32.

The gap spacing $t$ between guiding regions 31 and 32 should be large enough to enable an adequate flow of fluid 33, but small enough to insure that the evanescent or fringing field of the light guided in the regions 31 and 32 has a sufficient power density in the fluid to achieve an excess of gain over loss in the structure. Gap spacings in the order of the wavelength of the pumping light are desirable both for the flow of and the pump power density in the fluid in most configurations. In general, the penetration into the low index field 33 of the evanescent field of the light guided in regions 31 and 32 and therefore the power density of the field in fluid 33 can be increased in configurations where desirable by making $n_1$ only slightly less than $n_2$. However, this is limited by the fact that as $n_1$ becomes too close to $n_2$ the guiding regions become leaky and the light tends to propagate laterally beyond the limits determined by diameter D and into the channels of fluid of thickness $t$. A suitable compromise can be readily achieved in most cases to optimize the relative index relationship of guiding regions 31 and 32 and fluid 33 together with the value of the gap spacing $t$.

The overall length of guiding regions 31 and 32 and therefore of the split guiding structure 12 between windows 21 and 22 can vary depending upon the total gain desired. It should be clear that as the length is increased, the pathlength of the region of excited fluid becomes longer and hence, the total gain is increased. Typical lengths of regions 31 and 32 and therefore split guiding structure 12 would be several centimeters or more.

Oscillation can be achieved in a typical configuration of FIGS. 1A and 1B using a split guiding structure 12 like that of FIGs. 2A and 2B in which the fluid 33 is a Raman-active fluid such as benzene and the supplied light is from source 17, an argon ion laser operating at 0.5145 $\mu$ in the green region of the spectrum, with pulses about 20 microseconds long and having peak powers ranging from about 5 watts to about 10 watts. This power level contrasts to a peak pulse power of several tens of kilowatts at this wavelength required in prior art Raman oscillators.

The benzene has an index of refraction of about 1.500. To satisfy Equations (1) and (2) above, therefore, the guiding regions 31 and 32 could be composed of glass doped with a suitable index raising material to have an index greater, i.e. by a factor of $(1 + \Delta)$, than that of solid members 13 and 14, which can be composed of undoped glass. A diameter D of the guiding regions 31 and 32 of 10.00 microns, and gap spacing $t$ of 0.50 microns are appropriate for the configuration. With the above-mentioned parameters, pressures supplied by source 26 in the range of 5 pounds per square inch and flow rates less than a centimeter per second should be more than adequate to maintain superior optical quality of fluid 33 within the split guiding structure 12. It may be noted that the flow rates required are about three orders of magnitude lower than those required for prior art Raman oscillators. The output of Raman-shifted pulses should have a frequency of $5.53 \times 10^5$ gigahertz (which corresponds to a wavelength of 5422 A) as contrasted to a frequency of $5.84 \times 10^5$ gigahertz (which corresponds to a wavelength of 5145 A) of the supplied light from argon ion laser source 17.

It should be readily apparent to one skilled in the art that with continual replenishment of the Raman-active medium in the above-described configuration, continuous-wave oscillation can also be achieved with a continuous-wave source 17. Such an oscillator would be a very desirable source of a local oscillator wave for an optical communications system. Several such devices pumped by the same source 17 could provide several difference-frequency shifts from the frequency of the supplied light thus providing a plurality of sources suitable for a frequency-multiplexed communications system. To that end, it is merely necessary to change the frequency of the peak reflectivity of the reflectors 18 and 24, and/or to change the Raman-active medium.

Numerous other Raman-active media can be used in the device of the above-described configuration provided the index of refraction of the media is less than that of guiding regions 31 and 32 and solid members 13 and 14 to insure adequate guiding of both the pumping light and output radiation. Raman oscillation could be achieved in the various media with a suitable choice of resonator characteristics. Solutions of several Raman-active liquids mixed together are also feasible.

It should be clear that the same principles described in reference to FIGS. 2A and 2B apply even if the fluid 33 is not a Raman-active liquid, but a dye laser medium.

Figure 3A:
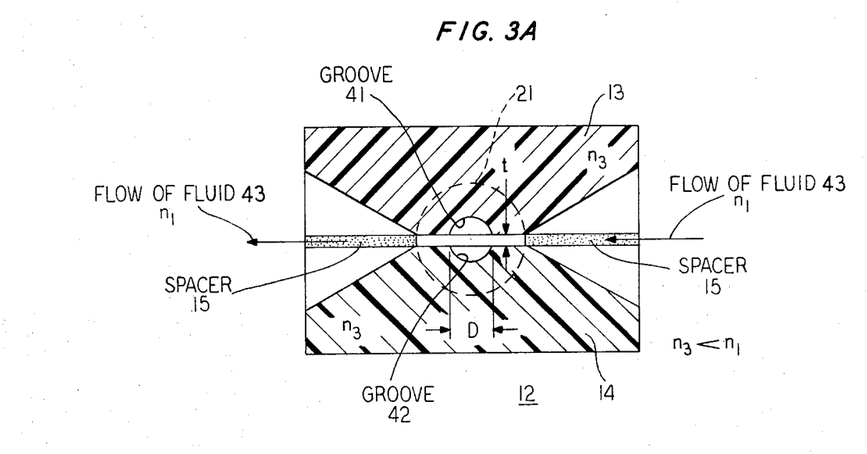
FIG. 3A is a partially pictorial, partially schematic illustration of a second embodiment of our invention showing a section view of the split guiding structure similar to that of FIG. 2A.
Figure 3B:
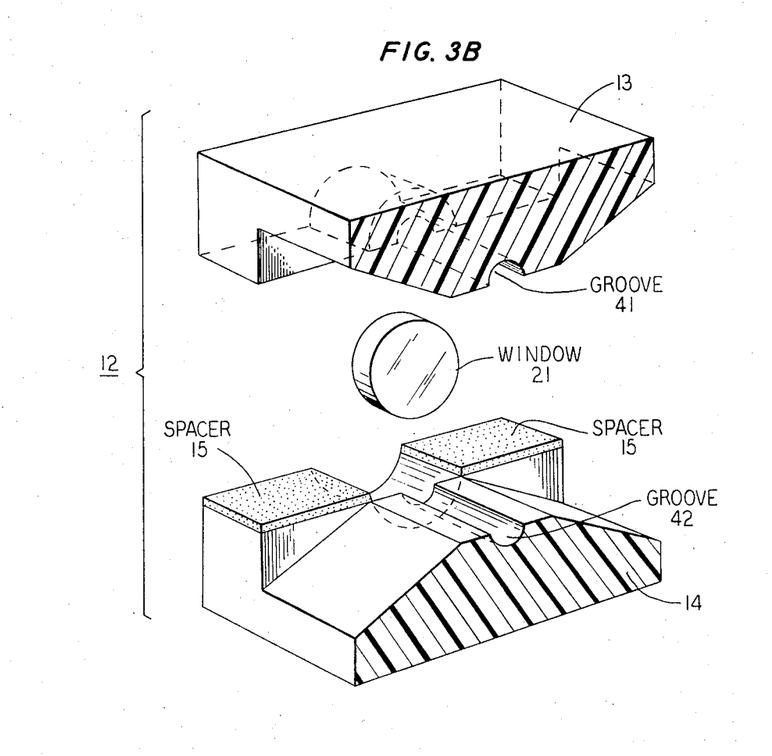
FIG. 3B is an exploded perspective view of the section of the split guiding structure of FIG. 3A.

To illustrate a second embodiment of our invention, reference is made to FIGS. 3A and 3B, which like FIGS. 2A and 2B, show a section view of a split guiding structure 12.

In FIGS. 3A and 3B, solid members 13 and 14 include hemi-cylindrical grooves 41 and 42 extending from window 21 to window 22 (not shown). The solid members 13 and 14 are composed of an optically transparent material having a lower index of refraction than fluid 43. The pressurized fluid 43 fills the region between members 13 and 14 determined by grooves 41 and 42 and gap spacing $t$ as shown. The monochromatic pumping light, launched through window 21, is guided in and along this region of the fluid to excite the fluid directly as it passes transversely through structure 12. The emitted radiation is also guided by the region of the fluid and reflects back and forth through the structure.

For guidance in the present embodiment, it will be assumed that:

$$n_3 < n_1 \quad (4)$$

for both the monochromatic light and the desired output radiation, where $n_1$ is the index of refraction of fluid 43 and $n_3$ is the index of solid members 13 and 14 as shown in FIG. 3A. More specifically, for single mode guiding at a particular wavelength, it may be advantageous to have:

$$n_1 \approx n_3(1 + \Delta) \quad (5)$$

where $n_1$, $n_3$ and $\Delta$ are all defined above. In addition, the hemi-cylindrical grooves 41 and 42 may have a diameter D as shown, anywhere in the range from about the wavelength of the guided light to 100 times the wavelength.

To insure that the guiding region formed by grooves 41 and 42 is not leaky, that is, the pumping light does not leak out of the region determined by diameter D and into the fluid channels of thickness $t$, the thickness is preferably small compared to the wavelength of the guided light and the diameter D. Since the fluid flow rates required for the devices disclosed are low, the value of $t$ in this embodiment can be kept to a minimum, i.e., in the range of 0.10 times the wavelength of the monochromatic light to one wavelength, without necessitating the use of unreasonably high fluid pressure in source 26.

To further insure that the guiding regions are not leaky, it might be desirable in some arrangements to make the refractive index of solid member 13 slightly less or slightly greater than the refractive index of solid member 14. For example, assuming $$n_3' < n_3'' \quad (6)$$

where $n_3'$ is now the index of refraction of solid member 13 and $n_3''$ is the refractive index of solid member 14, the solid members and fluid 43 will constitute a nonsymmetrical guide with a guided mode in the region of gap spacing $t$ only for relatively large values of $t$.

In a typical configuration of FIGS. 1A and 1B using the split guiding structure 12 like that of FIGS. 3A and 3B, the fluid 43 is a dye laser medium such as Rhodamine 6G in a water ($H_2O$) solution pumped by source 17, an argon ion laser operating at a wavelength of 0.5145 micrometers with about 1 watt of continuous-wave pumping power.

The water solution has an index of refraction of approximately 1.330. It is advantageously doped with a suitable index raising material such as glycerine, to raise its index to approximately 1.340. The solid members 13 and 14 may then be composed of a suitable plastic, such as fluorinated ethylene propylene (FEP), which has an index of approximately 1.338, to satisfy Equations (4) and (5) above.

The diameter D of hemi-cylindrical grooves 41 and 42 is again approximately 10.00 microns. Spacing $t$ of approximately 0.10 microns is sufficient to insure negligible leakage in the guide. The length of the grooves 41 and 42, and, therefore, the split guiding structure 12 between windows 21 and 22, is again several centimeters or more to provide adequate total gain.

In operation, continuous-wave dye laser action in the above-described configuration is achieved because the optical guiding action of the region of the dye between solid members 13 and 14 enables relatively low pumping intensity together with relatively low dye concentrations. The configuration also prevents thermal blooming or defocusing, and reduces dye molecule bleaching and thus requiring only moderate flow rates of the dye liquid medium through structure 12, i.e., less than a centimeter per second.

Numerous other dye laser media could be used in the embodiment of FIGS. 3A and 3B provided Equation (4) above is satisfied. For example, Rhodamine 6G in a benzylalcohol solution, with an index of approximately 1.550 might be used with solid members 13 and 14 composed of glass. Additionally, it should be clear that the same principles described in reference to FIGS. 3A and 3B apply even if fluid 43 is not a dye laser medium, but a Raman-active liquid.

Figure 4:
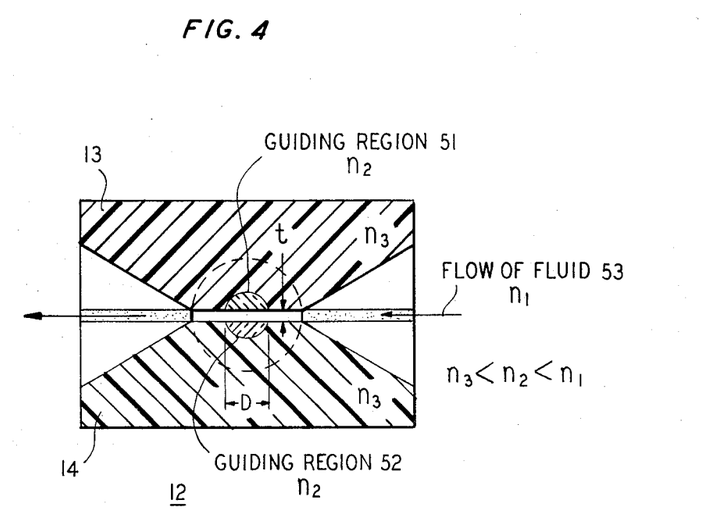
FIGS. 4 and 5 show modifications of the basic embodiments of FIGS. 2A and 3A.

FIG. 4, a view similar to that of FIGS. 2A and 3A, illustrates an additional embodiment of our invention which comprises a variation of the two above-mentioned ones. Solid members 13 and 14 of split guiding structure 12 here contain hemi-cylindrical guiding regions 51 and 52 of lower refractive index than fluid 53 and of higher refractive index than members 13 and 14. The monochromatic pumping light is launched into structure 12 through window 21 and is guided in the region of the fluid 53 determined by gap spacing $t$ and diameter D of regions 51 and 52. The fluid 53 is again directly excited by the propagating monochromatic light.

In this embodiment, $$n_3 < n_2 < n_1 \quad (7)$$

for both the monochromatic pumping light and the desired output, where $n_1$, $n_2$, and $n_3$ are the refractive indices of the fluid 53, guiding regions 51 and 52, and solid members 13 and 14, respectively. The guided light propagates primarily in the region of the high index fluid 53. Regions 51 and 52 act to reduce leakage of the light laterally beyond their own limits into the fluid channels of thickness $t$ by concentrating most of the guided light in the region of the fluid determined by the diameter D.

The split guiding structure 12 of FIG. 4 is again desirable for use in either a Raman-emission device or a dye laser. The relevant parameters need not be any different than those contemplated for the two preceding embodiments. Numerous arrangements of materials and active media to satisfy Equation (7) above are readily devised.

Figure 5:
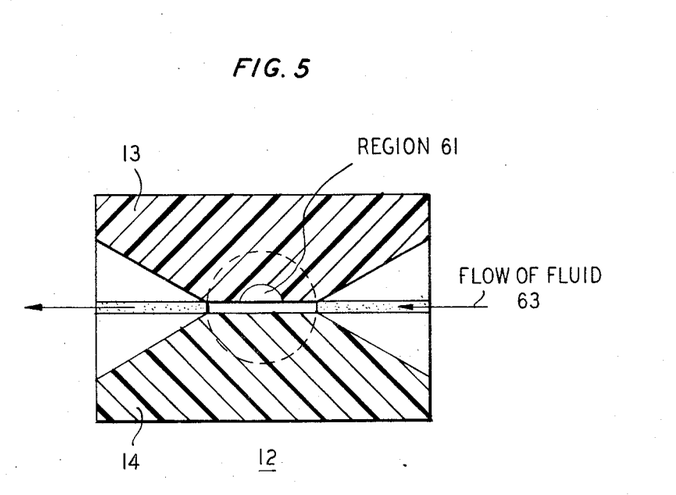

In FIG. 5, a slightly different modification of our invention is shown and comprises a nonsymmetrical construction of split guiding structure 12 in which solid member 14 has a uniform index throughout its volume and contains neither a guiding region nor a groove, but simply a flat surface which determines one limit of the gap spacing $t$. Solid member 13 may then be of the type described in any of the preceding embodiments. In other words, region 61 may either be a guiding region of higher index than fluid 63 similar to region 31 of FIG. 2A, a groove similar to groove 41 of FIG. 3A, or a guiding region of lower index than fluid 63 similar to region 51 of FIG. 4.

This embodiment is governed basically by the same physical parameters as the above-described corresponding ones with only solid member 13 and region 61 facilitating guidance of the pumping light and the output radiation. Solid member 14 may here be moved laterally in either direction without affecting the guidance of the radiation. This embodiment, therefore, avoids any difficulties which might arise in the alignment of the guiding regions in split guiding structures that are symmetrical about the gap spacing $t$ as in the preceding embodiments.

Numerous other arrangements can be made in accordance with the principles described hereinabove without departing from the scope of our invention. For example, the reflectors 18 and 24 in FIGS. 1A and 1B could be removed, and a feedback mechanism, essential to oscillation, could be distributed throughout and integrated with the active fluid in split guiding structure 12 in much the same manner as disclosed in the copending application of H. W. Kogelnik and C. V. Shank, Ser. No. 100,659, filed Dec. 22, 1970, now abandoned and assigned to the assignee hereof. The feedback structure would be created by substantially time constant, spatially periodic perturbations in the transmission characteristics of the active fluid along the length of the guiding region of split guiding structure 12. The perturbations could be typically produced by holographic means or acoustic waves launched into structure 12. Tunability of the device would then be feasible by varying the spacing of the periodic perturbations.

Additionally, for all the split guiding structures shown, a number of geometries of the guiding regions are possible. Guiding regions or grooves with other than the hemi-cylindrical geometry, e.g., formed with planar or elliptical surfaces, may be more desirable in particular applications.

We claim:

1. A device of the type in which a fluid active medium is included in a guiding structure coupled to means for launching monochromatic radiant energy into said structure to produce the stimulated emission of radiation in said medium and including means for stimulating the coherent radiation, characterized in that the guiding structure is a split guiding structure including two spaced solid members disposed in contact with and coupled to a limited region of said fluid medium in the separation therebetween, said separation being of the order of the wavelength of said monochromatic radiant energy, at least one of said solid members including a region adapted for facilitating guiding of said monochromatic radiant energy and said stimulated radiation, and the launching means launches into said guiding region the monochromatic radiant energy at a power level for which gain exceeds losses in said limited region of said fluid medium.

2. A device of the type claimed in claim 1, in which the active medium is a Raman-active medium.

3. A device of the type claimed in claim 1, in which the active medium is a dye laser active medium.

4. An optical apparatus for the stimulated emission of radiation, comprising a liquid active medium both providing gain at a first frequency and undergoing damage when subjected to an optical pumping radiation at a second frequency, a split guiding structure including two spaced optically transparent solid members disposed in contact with and coupled to a limited region of said liquid medium in the separation therebetween, said separation being of the order of the wavelength of said pumping radiation, at least one of said solid members including a region adapted for guiding of radiation at said first frequency and said pumping radiation, means for storing a substantial quantity of said liquid medium in a position facilitating flow through said separation transverse to the long axis of said guiding region, means for flowing said liquid medium from said storing means to contact said guiding region, and means for stimulating the coherent emission of said radiation at said first frequency in said limited region of said liquid medium, whereby the flow of said liquid medium removes the effect of the damage occurring in said liquid medium in said limited region.

5. An optical apparatus according to claim 4 in which the separation between said solid members is in the range from about 0.10 to 10.0 times the wavelength of said pumping radiation.

6. An optical apparatus according to claim 5 in which the solid members, the guiding region and the liquid medium differ in index of refraction by an amount insuring that a substantial portion of the pumping radiation propagates in the liquid medium between the spaced solid members.

7. An optical apparatus according to claim 6 in which said guiding region is an optically transparent region of one of said solid members having a higher refractive index than said liquid medium and the remainder of said solid member and having a dimension in which the guiding is to take place comparable to the wavelengths of said radiation to be guided therein.

8. An optical apparatus according to claim 6 in which said guiding region is a groove in one of said solid members filled with said liquid medium, said solid member having a lower refractive index than said liquid medium and said groove having a dimension in which the guiding is to take place comparable to the wavelengths of said radiation to be guided therein.

9. An optical apparatus according to claim 6 in which said guiding region is an optically transparent region of one of said solid members having a lower refractive index than said liquid medium and a higher refractive index than the remainder of said solid member and having a dimension in which the guiding is to take place comparable to the wavelengths of said radiation to be guided therein.

10. A device of the type in which an active medium is included in a guiding structure coupled to means for launching monochromatic radiant energy into said structure to produce the stimulated emission of radiation in said medium, characterized in that the guiding structure is a split guiding structure including two spaced optically transparent solid members disposed in contact with and coupled to a limited region of said active medium in the separation therebetween, said separation being of the order of the wavelength of said monochromatic radiant energy, at least one of said solid members including a region adapted for guiding of said monochromatic radiant energy and said stimulated radiation, said device further including means for storing a substantial quantity of said medium in a position facilitating flow through said separation transverse to the long axis of said guiding region, and means for flowing said medium from said storing means to contact said guiding region, whereby said flow maintains a desired optical quality of the liquid medium in said limited region.

11. A device for the type claimed in claim 10, in which the separation between said solid members is in the range from about 0.10 to 10.0 times the wavelength of said monochromatic radiant energy.

12. A device of the type claimed in claim 11 in which the solid members, the guiding region and the liquid medium differ in index of refraction by an amount insuring that a substantial portion of the pumping radiation propagates in said active medium between the spaced solid members.

13. A device of the type claimed in claim 12 in which said guiding region is an optically transparent region of one of said solid members having a higher refractive index than said active medium and the remainder of said solid member and having a dimension in which the guiding is to take place comparable to the wavelengths of said monochromatic radiant energy and said stimulated radiation to be guided therein.

14. A device of the type claimed in claim 12 in which said guiding region is a groove in one of said solid members filled with said active medium, said solid member having a lower refractive index than said active medium and said groove having a dimension in which the guiding is to take place comparable to the wavelengths of said monochromatic radiant energy and said stimulated radiation to be guided therein.

15. A device of the type claimed in claim 12 in which said guiding region is an optically transparent region of one of said solid members having a lower refractive index than said active medium and a higher refractive index than the remainder of said solid member and having a dimension in which the guiding is to take place comparable to the wavelengths of said monochromatic radiant energy and said stimulated radiation to be guided therein.

* * * * *